Patented Aug. 17, 1954

2,686,764

UNITED STATES PATENT OFFICE 2,686,764

LEATHER-FINISHING COMPOSITIONS CONTAINING CAPROLACTAM AND A RESINOUS POLYMER

Carl H. Geister, Wilmington, and James M. Collins, New Castle, Del., assignors to E. I. du Pont de Nemours & Company, Wilmington, Del., a corporation of Delaware No Drawing. Application November 9, 1951, Serial No. 255,743

4 Claims. (Cl. 260—8)

This invention relates to a process for finishing leather and to the compositions used therein. More particularly it relates to the use of leather-finishing compositions which contain caprolactam together with thermoplastic resins or elastomeric materials.

In the finishing of leather, it is often necessary or desirable to apply a resin finish to the surface of the leather in order to improve its physical appearance or properties. Such a finish serves to hide minor surface imperfections of the leather and to build up a smooth layer over the naturally fibrous surface of the leather. By such a treatment, the feel and luster of the leather surface may be improved and it is also possible to make the surface more water-repellent and oil-resistant and less slippery.

The incorporation of resin finishes into the surface of leather is not always accomplished successfully. If the finish does not penetrate sufficiently, the resin film is apt to pull away from the leather surface, particularly when the leather is flexed. Unless uniform application and penetration of the finish are obtained, the surface irregularities may become more rather than less pronounced as a result of the treatment. To avoid these difficulties, certain finishing materials have been selected primarily for their penetrating and spreading properties. Such finishes are in many cases deficient in other desirable properties. Another approach to the problem of securing sufficient penetration and spreading of the finish is to add wetting agents in substantial amount to the finish mixture. Compositions containing large amounts of wetting agents, however, generally soften the leather unduly and give it an undesirable glossy feel.

It is an object of this invention to provide a leather-finishing composition which contains resinous or elastomeric ingredients and which penetrates and spreads on the leather surface to a satisfactory extent.

According to the present invention, improved effects are obtained by applying to the surface of the leather a finishing composition consisting of an aqueous emulsion containing caprolactam and a macromolecular polymer of a monomeric compound containing olefinic unsaturation. Particularly effective compositions are those containing thermoplastic resins such as butyl methacrylate resin.

The term "caprolactam" as used herein refers to the lactam of epsilon-aminocaproic acid. This compound is sometimes called epsilon-caprolactam (Beilstein, 4th ed., vol XXI, p. 290). It is available commercially as a dry powder or as a concentrated aqueous solution containing about 65% caprolactam. It serves to increase the penetrating and leveling characteristics of the leather finish without softening or otherwise impairing in any way the natural feel of the finished surface.

The thermoplastic resins which may constitute a principal ingredient in the compositions of this invention include those obtained from polymerizable vinyl compounds such as vinyl chloride, vinyl acetate, styrene and acrylonitrile. Polymers of the lower alkyl acrylates and the lower alkyl methacrylates represent a preferred group of resins. Such compounds in which the alkyl group contains from one to four carbon atoms are most generally useful.

As the macromolecular polymer, there may also be used an elastomeric material obtained by the polymerization of butadiene or one of its homologues or derivatives, such as 2-methyl-1,3-butadiene (isoprene), 2,3-dimethyl-1,3-butadiene and 2-chloro-1,3-butadiene. Various copolymers may be used, particularly those of butadiene with styrene or with acrylonitrile.

The weight ratio of caprolactam to the polymer in the compositions of this invention may vary from 0.01 to 1.2. When less than 1% caprolactam, based on the polymer, is used the composition does not penetrate and spread to the desired extent, while the use of more than 120% caprolactam is uneconomical. Amounts of caprolactam in the higher portion of this range will be selected when more complete penetration is wished or when resins having naturally poor spreading characteristics are employed.

The finish composition may contain various other of the common adjuvant materials for leather finishes, such as dyes, pigments, casein, other albuminous materials, waxes, and detergents.

The practice of this invention is illustrated by the following examples in which parts are by weight:

Example 1

Twenty-five (25) parts of a 33% aqueous emulsion of butyl methacrylate are adjusted to pH 8.0 with aqueous ammonia. To this is added 25 parts of a dispersion made by grinding together 30 parts of a commercially-available ferric oxide pigment, 30 parts of a 12% aqueous casein solution, 4 parts of sulfonated castor oil, 4 parts of a 2% aqueous sodium carboxymethylcellulose solution, and 32 parts of water. There are then added 50 parts of an aqueous solution containing 5 parts of a direct red dye (Colour Index 430) and 5 parts of caprolactam.

The mixture thus obtained has the following over-all composition:

| | Per cent by weight |
|---|---|
| Butyl methacrylate resin | 8.25 |
| Ferric oxide pigment | 7.5 |
| Caprolactam | 5.0 |
| Direct dye, Colour Index 430 | 5.0 |
| Sulfonated castor oil | 1.0 |
| Casein | 0.9 |
| Sodium carboxymethylcellulose | 0.02 |
| Water | 72.33 |

The finish is swabbed on calfskin, dried, and hot pressed at 94° C. and 1000 p. s. i. The finish gives substantially better coverage, and penetrates better than a control finish containing no caprolactam. Without the caprolactam, a maximum of 2% of the dye can be incorporated.

*Example 2*

Finishes are prepared according to Example 1 with the substitution of an equal weight of a 12% aqueous casein solution for the pigment. The finish containing caprolactam again shows markedly superior penetration of the leather as compared with the finish without caprolactam.

*Example 3*

Twenty-five (25) parts of a 40% aqueous emulsion of a 50:50 copolymer of 2-chloro-1,3-butadiene and styrene and 2.5 parts of a 10% aqueous solution of caprolactam are mixed, and the pH is adjusted to 8.0 with ammonia. There is next added 35 parts of a pigment paste, consisting of 10 parts inorganic pigment (consisting of 63% ferric oxide, 22% lead chromate and 15% carbon black) ground in 12% aqueous casein solution. Finally 37.5 parts of water are added.

This finish is swabbed on leather, dried, and pressed at 90° C. and 1000 p. s. i. The finished leather has a more pleasing appearance, and exhibits better resistance to flexing than leather finished with a composition containing no caprolactam but otherwise similar.

The emulsions of this invention may be applied to the leather surface by any conventional procedure, as by swabbing, brushing or spraying.

By their use, leather having improved surface properties such as feel, luster, water resistance and the like may be obtained in such a way that the finish is tightly bonded to the leather and displays little tendency toward cracking or peeling. As a result of the excellent spreading qualities of these compositions, the leather is covered uniformly and economically.

We claim:

1. A leather-finishing composition comprising an aqueous emulsion containing caprolactam and a resinous homopolymer of a compound from the group consisting of lower alkyl acrylates and lower alkyl methacrylates, the weight ratio of caprolactam to polymer being from 0.01:1 to 1.2:1.

2. A leather-finishing composition comprising an aqueous emulsion containing caprolactam and a butyl methacrylate homopolymer, the weight ratio of caprolactam to polymer being from 0.01:1 to 1.2:1.

3. A leather-finishing composition consisting of:

| | Percent by weight |
|---|---|
| Butyl methacrylate resin | 8.25 |
| Ferric oxide pigment | 7.5 |
| Caprolactam | 5.0 |
| Direct dye, Colour Index 430 | 5.0 |
| Sulfonated castor oil | 1.0 |
| Casein | 0.9 |
| Sodium carboxymethylcellulose | 0.02 |
| Water | 72.33 |

4. In a process of finishing leather, the step which comprises applying to the surface of the leather an aqueous emulsion containing caprolactam and a resinous homopolymer of a compound from the group consisting of lower alkyl acrylates and lower alkyl methacrylates, the weight ratio of caprolactam to polymer being from 0.01:1 to 1.2:1.

References Cited in the file of this patent

UNITED STATES PATENTS

| Number | Name | Date |
|---|---|---|
| 2,404,719 | Houtz | July 23, 1946 |
| 2,550,363 | Luten et al. | Apr. 24, 1951 |